US012789816B2

(12) United States Patent
Phelan

(10) Patent No.: US 12,789,816 B2
(45) Date of Patent: Nov. 10, 2026

(54) DRIVER AUTHENTICATION SYSTEM AND METHOD FOR MONITORING AND CONTROLLING VEHICLE USAGE

(71) Applicant: Michael Phelan, Santa Fe, NM (US)

(72) Inventor: Michael Phelan, Santa Fe, NM (US)

( * ) Notice: Subject to any disclaimer, the term of this patent is extended or adjusted under 35 U.S.C. 154(b) by 827 days.

(21) Appl. No.: 17/746,101

(22) Filed: May 17, 2022

(65) Prior Publication Data

US 2023/0373494 A1 Nov. 23, 2023

(51) Int. Cl.

*B60W 40/00* (2006.01)
*B60W 40/09* (2012.01)
*G07C 5/00* (2006.01)
*G07C 5/08* (2006.01)
*B60W 40/08* (2012.01)

(52) U.S. Cl.

CPC ............. *B60W 40/09* (2013.01); *G07C 5/008* (2013.01); *G07C 5/0841* (2013.01); *B60W 2040/0809* (2013.01); *B60W 2540/043* (2020.02); *B60W 2540/30* (2013.01)

(58) Field of Classification Search

None
See application file for complete search history.

(56) References Cited

U.S. PATENT DOCUMENTS 5,465,079 A 11/1995 Bouchard et al.
5,481,253 A * 1/1996 Phelan .................... B60R 25/04 307/10.6
6,198,996 B1 * 3/2001 Berstis ................ B60R 25/2081 726/20
6,225,890 B1 * 5/2001 Murphy ............... G07C 5/0858 340/5.1
6,430,488 B1 * 8/2002 Goldman ............ B60R 25/2081 701/1

(Continued)

FOREIGN PATENT DOCUMENTS

JP 2007235530 9/2007

OTHER PUBLICATIONS

Non-final Office Action Aug. 27, 2018, U.S. Appl. No. 15/336,110.

(Continued)

*Primary Examiner* — Jonathan M Dager
(74) *Attorney, Agent, or Firm* — KPPB LAW; Luis M. Ortiz; Kermit D. Lopez

(57) ABSTRACT

A driver authentication and safety system and method for monitoring and controlling vehicle usage by high-risk drivers. A centralized database comprising a software application can be accessed by an authorized user via a data communications network utilizing a remote computer in order to configure a desired operating profile that matches requirements of the high-risk driver. The operating profile can be loaded to a driver identification and data logging module in conjunction with the remote computer. A master control unit receives a unique identification code from the data logging device to authenticate the high-risk driver and to operate the vehicle within the desired operating profile. A slave control unit receives commands from the master control unit and generates a real time alarm signal if the driver violates the preprogrammed operating profile unique to the driver.

43 Claims, 8 Drawing Sheets

(56) References Cited

U.S. PATENT DOCUMENTS 6,470,240 B1 * 10/2002 Haynes ................ G07C 5/0875 701/1
6,577,937 B1 6/2003 Shuman et al.
6,741,920 B1 * 5/2004 Otto ...................... B60R 16/037 340/5.6
7,956,730 B2 6/2011 White et al.
8,131,441 B2 * 3/2012 Nallapa ............... B60W 50/085 701/87
8,258,939 B2 * 9/2012 Miller ..................... B60R 25/00 340/572.1
8,417,415 B2 4/2013 Phelan
8,463,488 B1 * 6/2013 Hart ....................... G07C 5/008 701/32.4
8,751,105 B2 * 6/2014 Whelan ................... B60R 25/00 180/287
9,045,101 B2 6/2015 Phelan
9,104,535 B1 * 8/2015 Brinkmann ............ G07C 5/085
9,493,149 B2 11/2016 Phelan
9,908,508 B2 3/2018 Phelan
10,259,465 B2 4/2019 Phelan
10,259,470 B2 4/2019 Phelan
2002/0049538 A1 * 4/2002 Knapton ................... G01S 5/01 701/472
2002/0173881 A1 * 11/2002 Lash ......................... G01P 3/50 701/1
2003/0181822 A1 * 9/2003 Victor .................. G06V 20/597 600/558
2003/0204290 A1 * 10/2003 Sadler .................... G06V 40/10 701/1
2003/0231550 A1 * 12/2003 Macfarlane ........... B60R 25/257 340/5.72
2004/0064221 A1 * 4/2004 DePrez .................. G01D 21/00 701/2
2004/0225557 A1 * 11/2004 Phelan .................. G01M 17/00 701/1
2005/0137757 A1 * 6/2005 Phelan ..................... G07C 5/02 701/1
2005/0182538 A1 * 8/2005 Phelan ................. G07C 5/0858 701/33.4
2005/0237150 A1 * 10/2005 Sun .................... G07C 9/00182 340/426.22
2005/0288837 A1 * 12/2005 Wiegand ............... B60R 16/037 701/36
2006/0047419 A1 * 3/2006 Diendorf ................ G01C 21/26 340/552
2006/0052909 A1 3/2006 Cherouny
2006/0066149 A1 * 3/2006 Holloway ............... B60R 25/24 340/5.2
2006/0106515 A1 * 5/2006 Phelan ................... G07C 5/008 701/33.4
2006/0111817 A1 * 5/2006 Phelan ................... G07C 5/008 701/1
2006/0122749 A1 * 6/2006 Phelan ..................... G07C 5/08 701/33.4
2006/0200008 A1 * 9/2006 Moore-Ede ............ B60K 28/06 128/920
2006/0212195 A1 * 9/2006 Veith ...................... G06Q 10/06 701/33.4
2007/0082706 A1 * 4/2007 Campbell ............... G10L 15/26 704/E15.04
2007/0093200 A1 4/2007 Dobosz
2007/0129056 A1 * 6/2007 Cheng ................... H04L 51/212 455/418
2007/0155368 A1 * 7/2007 Phelan .................. H04W 8/245 455/412.1
2007/0158128 A1 * 7/2007 Gratz .................... B60R 25/252 180/282
2007/0168125 A1 * 7/2007 Petrik ................... B60R 25/252 701/469
2007/0200663 A1 * 8/2007 White ................... B60R 25/255 340/5.31
2008/0039998 A1 * 2/2008 Fein ....................... G06Q 30/00 701/36
2008/0136611 A1 * 6/2008 Benco ................. B60R 25/2018 340/426.3
2008/0150683 A1 * 6/2008 Mikan ................ G07C 9/00309 340/5.31
2008/0188217 A1 8/2008 Harter et al.
2008/0245598 A1 * 10/2008 Gratz ...................... B60R 25/25 701/469
2008/0269979 A1 * 10/2008 Hermann .............. H04L 41/082 701/29.6
2008/0303629 A1 12/2008 Yamagiwa
2008/0319602 A1 * 12/2008 McClellan ............. G07C 5/085 701/31.4
2009/0024273 A1 * 1/2009 Follmer ................. G06Q 10/10 701/33.4
2009/0027177 A1 * 1/2009 Hodder ................... B60R 25/04 340/426.11
2009/0030770 A1 * 1/2009 Hersh ................ G06Q 10/1097 340/988
2009/0069954 A1 * 3/2009 Aladesuyi ............... B60R 25/33 701/2
2009/0079555 A1 * 3/2009 Aguirre De Carcer ...................... G07C 5/008 701/2
2009/0189736 A1 * 7/2009 Hayashi .................. G06F 21/32 340/5.81
2010/0004818 A1 1/2010 Phelan
2010/0045452 A1 * 2/2010 Periwal .................... B60Q 9/00 340/439
2010/0087986 A1 * 4/2010 Lal ........................ B60R 16/027 701/36
2010/0161171 A1 * 6/2010 Valentine ................ B65B 37/04 701/31.4
2014/0303836 A1 10/2014 Phelan
2014/0358376 A1 * 12/2014 Phelan .................. B60W 10/20 701/41
2015/0314755 A1 11/2015 Phelan
2015/0350750 A1 * 12/2015 Yun .......................... H04Q 9/00 340/870.07
2016/0001715 A1 * 1/2016 Laifenfeld ............ B60R 16/023 701/32.7
2016/0001718 A1 * 1/2016 Laifenfeld .......... H04L 12/6418 701/32.7
2016/0086397 A1 * 3/2016 Phillips .................. G07C 5/008 701/1
2016/0114807 A1 * 4/2016 Phelan ..................... G08G 1/20 701/70
2017/0106877 A1 4/2017 Phelan
2018/0251132 A1 9/2018 Phelan
2019/0202474 A1 7/2019 Phelan
2019/0202475 A1 7/2019 Phelan
2020/0058174 A1 * 2/2020 Wright .................... G06F 17/00

OTHER PUBLICATIONS

Non-final Office Action Aug. 27, 2018, U.S. Appl. No. 15/898,322.

Information Disclosure Statement presented by petitinoer in ExParte Reexamination of U.S. Pat. No. 10,259,470.

Request for Ex Parte Reexamination of U.S. Pat. No. 10,259,470, dated Aug. 31, 2023, Signed by David C. Seastrunk (Reg. No. 73,723).

Certificate of Service, Request for Exparte Reexamination of U.S. Pat. No. 10,259,470 dated Aug. 31, 2023, Signed by David C. Seastrunk (Reg. No. 73,723).

Exparte Reexamination of U.S. Pat. No. 10,259,470 Letter from Ashley F. Cheung, Paralegal, dated Aug. 31, 2023.

Exhibit 1001, Request for Exparte Reexamination of U.S. Pat. No. 10,259,470.

Exhibit 1002, Request for Exparte Reexamination of U.S. Pat. No. 10,259,470.

Exhibit 1003, Request for Exparte Reexamination of U.S. Pat. No. 10,259,470.

(56) References Cited

OTHER PUBLICATIONS

Exhibit 1004, Request for Exparte Reexamination of U.S. Pat. No. 10,259,470.
Exhibit 1005, Request for Exparte Reexamination of U.S. Pat. No. 10,259,470.
Exhibit 1006, Request for Exparte Reexamination of U.S. Pat. No. 10,259,470.
Exhibit 1007, Request for Exparte Reexamination of U.S. Pat. No. 10,259,470.
Exhibit 1008, Request for Exparte Reexamination of U.S. Pat. No. 10,259,470.
Exhibit 1009, Request for Exparte Reexamination of U.S. Pat. No. 10,259,470.
Exhibit 1010, Request for Exparte Reexamination of U.S. Pat. No. 10,259,470.
Exhibit 1011, Request for Exparte Reexamination of U.S. Pat. No. 10,259,470.
Exhibit 1012, Request for Exparte Reexamination of U.S. Pat. No. 10,259,470.
*The Phelan Group, LLC* v. *Kia Corporation and Kia America, Inc.*, Civil Action No. 2:23-cv-94, In the United States District Court for the Eastern District of Texas Marshal Division.
*The Phelan Group, LLC* v. *Toyota Motor Corporation, Toyota Motor North America, Inc., Toyota Motor Engineering & Manufacturing North America Inc., and Toyota Motor Sales, U.S.A., Inc.,*Civil Action No. 2:23-cv-93, In the United States District Court for the Eastern District of Texas Marshal Division.
Case No. 2:23-CV-00093-JRG-RSP, EDTx, TDefendant: Toyota Motor Corporation, Toyota Motor North America, Inc., Toyota Motor Engineering & Manufacturing North America, Inc., and Toyota Motor Sales, U.S.A., Inc., Filing Date Mar. 7, 2023.
Case No. 2:23-cv-00094-JRG-RSP, EDTx, Defendant: Kia Corporation and Kia America, Inc., Filing Date Mar. 7, 2023.
Case No. 2:23-cv-00606-JRG, EDTx, Defendant: Honda Motor Company, Ltd, Filing Date Dec. 15, 2023.
Case No. 2:23-cv-00607-JRG, EDTx, Defendant: Mercedes-Benz Group, AG, Filing Date Dec. 15, 2023.
Case No. 2:23-cv-00611-JRG, Defendant: State Farm Mutual Automobile Insurance Company, Filing Date Dec. 18, 2023.
Ex Parte Reexamination Control No. 90/015,287.

* cited by examiner

DRIVER AUTHENTICATION SYSTEM AND METHOD FOR MONITORING AND CONTROLLING VEHICLE USAGE

INVENTION PRIORITY

This patent application is a continuation of U.S. patent application Ser. No. 16/288,854 entitled "Driver Authentication System and Method for Monitoring and Controlling Vehicle Usage," which was filed on Feb. 28, 2019 and is incorporated herein by reference in its entirety. U.S. patent application Ser. No. 16/288,854 in turn is a continuation of U.S. patent application Ser. No. 15/336,110, which was filed on Oct. 27, 2016, and is incorporated herein by reference in its entirety. U.S. patent application Ser. No. 15/336,110 issued as U.S. Pat. No. 10,259,470 on Apr. 16, 2019.

U.S. patent application Ser. No. 15/336,110 is a continuation of U.S. patent application Ser. No. 14/464,188, entitled "Driver Authentication System and Method for Monitoring and Controlling Vehicle Usage," which was filed on Aug. 20, 2014, and is incorporated herein by reference in its entirety. U.S. patent application Ser. No. 14/464,188 issued as U.S. Pat. No. 9,493,149 on Nov. 15, 2016.

U.S. patent application Ser. No. 14/464,188 is a continuation-in-part of U.S. patent application Ser. No. 13/858,930, entitled "Driver Authentication System and Method For Monitoring and Controlling Vehicle Usage," which was filed Apr. 8, 2013, and is incorporated herein by reference in its entirety. U.S. patent application Ser. No. 13/858,930 issued as U.S. Pat. No. 9,045,101 on Jun. 2, 2015.

U.S. patent application Ser. No. 13/858,930, is a continuation of U.S. patent application Ser. No. 12/496,509, entitled "Driver Authentication System and Method For Monitoring and Controlling Vehicle Usage," which was filed on Jul. 1, 2009, and is incorporated herein by reference in its entirety. U.S. patent application Ser. No. 12/496,509 issued as U.S. Pat. No. 8,417,415 on Apr. 9, 2013.

U.S. patent application Ser. No. 12/496,509 claims the priority and benefit under 35 U.S.C. § 119(e) of U.S. Provisional Patent Application Ser. No. 61/077,568, entitled "Systems and Methods for Monitoring and Controlling Vehicle Usage by Young Drivers", which was on filed Jul. 2, 2008 and is incorporated herein by reference in its entirety. This patent application therefore claims priority to the Jul. 2, 2008 filing date of U.S. Provisional Patent Application Ser. No. 61/077,568.

This patent application is also a continuation of U.S. patent application Ser. No. 16/288,877, which was filed on Feb. 28, 2019, and is incorporated herein by reference in its entirety. U.S. patent application Ser. No. 16/288,877 is a continuation of U.S. patent application Ser. No. 15/336,110, which was filed on Oct. 27, 2016 and is incorporated herein by reference in its entirety. U.S. patent application Ser. No. 15/336,110 issued as U.S. Pat. No. 10,259,470 on Apr. 16, 2019.

U.S. patent application Ser. No. 15/336,110 is a continuation of U.S. patent application Ser. No. 14/464,188, which was filed on Aug. 10, 2014, and is incorporated herein by reference in its entirety. U.S. patent application Ser. No. 14/464,188 issued as U.S. Pat. No. 9,493,149 on Nov. 15, 2016.

U.S. patent application Ser. No. 14/464,188 is a continuation-in-part of U.S. patent application Ser. No. 13/858,930, which was filed on Apr. 8, 2013 and is incorporated herein by reference in its entirety. U.S. patent application Ser. No. 13/858,930, issued as U.S. Pat. No. 9,045,101 on Jun. 2, 2015.

U.S. patent application Ser. No. 13/858,930 is a continuation of U.S. patent application Ser. No. 12/496,509, which claims the priority and benefit under 35 U.S.C. § 119(e) of U.S. Provisional Patent Application Ser. No. 61/077,568, entitled "Systems and Methods for Monitoring and Controlling Vehicle Usage by Young Drivers", filed Jul. 2, 2008, the disclosure of which is herein incorporated herein by reference in its entirety. U.S. patent application Ser. No. 16/288,877 therefore claims priority to the Jul. 2, 2008 filing date of U.S. Provisional Patent Application Ser. No. 61/077,568.

TECHNICAL FIELD

Embodiments are generally related to techniques for use in ensuring motor vehicle operation safety. Embodiments are also related to systems and methods for monitoring and controlling vehicle usage by high-risk drivers.

BACKGROUND

The widespread usage of motor vehicles for both personal and work related activities places millions of vehicles on roads each day with their operation being largely unmonitored. Unmonitored vehicle operation can lead to issues including, for example, abusive use of the vehicle and lack of experience. With more young drivers getting licenses each year, there has been an unfortunate increase in accidents along with the ensuing damage, debilitating injuries and sometimes death. Most of these accidents are attributable to speeding and generally poor driving habits.

FIG. 1 illustrates a graphical representation 100 that depicts the actual deaths in passenger vehicles by age provided by National Highway Transportation Safety Administration (NHTSA). The curve 110 represents the death rate associated with male drivers and the curve 120 represents the death rate of female drivers. From the graph 100, it is clear that the distribution of age related deaths is bi-modal, and clearly depicts the relationship between youth and auto fatality. Current data indicates that the offering of a driver education course results in a great increase in the number of licensed drivers without any decrease in the rate of fatal and serious crash involvement. Although such driver's education programs do teach safety skills, students are not motivated to utilize them and they actually foster overconfidence and do not fully address safety issues.

The factors that have been researched and proven as the leading contributors to accidents, injuries and fatalities among at risk drivers include lack of driving experience, inadequate driving skills, risk-taking behavior, poor judgment and decision making, distraction, lack of focus, fatigue, and impairment. As a result of these factors.

Based on the foregoing it is believed that a need exists for an improved driver authentication system and method for monitoring and controlling vehicle usage by a high-risk driver. A need also exists for an improved method for identifying and authenticating the driver and programming the vehicle operating parameters that trigger control and driver feedback intervention, as described in greater detail herein.

BRIEF SUMMARY

The following summary is provided to facilitate an understanding of some of the innovative features unique to the present invention and is not intended to be a full description. A full appreciation of the various aspects of the embodiments disclosed herein can be gained by taking the entire specification, claims, drawings, and abstract as a whole.

It is, therefore, one aspect of the present invention to provide for an improved driver authentication system and method.

It is another aspect of the present invention to provide for an improved system and method for monitoring and controlling vehicle usage by high-risk drivers.

It is further aspect of the present invention to provide for an improved method for remotely and/or wirelessly identifying and authenticating the driver and remotely and/or wirelessly programming the vehicle operating parameters that trigger vehicle control and driver feedback intervention.

The aforementioned aspects and other objectives and advantages can now be achieved as described herein. A driver authentication system and method for monitoring and controlling vehicle usage by a high-risk driver (e.g., teen driver, fleet or rental drivers, habitual reckless drivers, aged drivers, drunk drivers, drowsily drivers, distracted drivers etc.) is disclosed. A proprietary and centralized database comprising a software application can be accessed by an authorized user via a network utilizing a remote computer in order to configure a desired operating profile that matches requirements of the high-risk driver. The operating profile can be loaded to a driver identification and data logging module in conjunction with the remote computer. A master control unit can receive a unique identification code from the data logging device to authenticate the high-risk driver and to operate the vehicle within the desired operating profile. A slave control unit receives commands from the master control unit and generates a real time alarm signal if the driver violates the preprogrammed operating profile unique to the driver.

The alarm signal generated by the slave control unit can remain until the driver corrects the operating condition and brings the vehicle within the desired operating profile. Also, the system can provide an alarm signal to the authorized user (e.g., parent) utilizing an auto dial feature that communicates the authorized user via a telephone or internet when the driver violates preprogrammed operating profile. The operating parameters can be for example, but not limited to, data concerning maximum allowable vehicle speed, vehicle location, vehicle hours of operating and seat belt usage. The slave control unit can generate the alarm signal via a voice synthesized means, sounding a cabin buzzer, toggling the dome light and/or powering the radio off, etc. The driver identification and data logging module can allow identification of various drivers associated with the vehicle, thereby allowing the vehicle to perform in one way for the intended high-risk drivers, yet another way for the authorized user. The system can include a GPS (Global Positioning System) module to determine and measure parameters such as, time of day, speed and location data associated with the vehicle.

The driver authentication system can include additional features such as data logging, alarming, operation governance, ease of programmability and can utilize GPS technology to provide high-risk driver safety. The system also provides user awareness that reduce the likelihood of a high-risk driver injury or fatality by helping the high-risk drivers with safe driving habits through immediate and real time feedback and governing. The programmable operating parameters associated with the real time driver feedback can categorize the system as a unique driver safety device. Additionally, the system and method described herein can provide multiple operating profiles for a single vehicle that allows the owners to operate the vehicle without any restrictions yet have restrictions in affect when the vehicle is operated by the high risk driver.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

Figure 2:
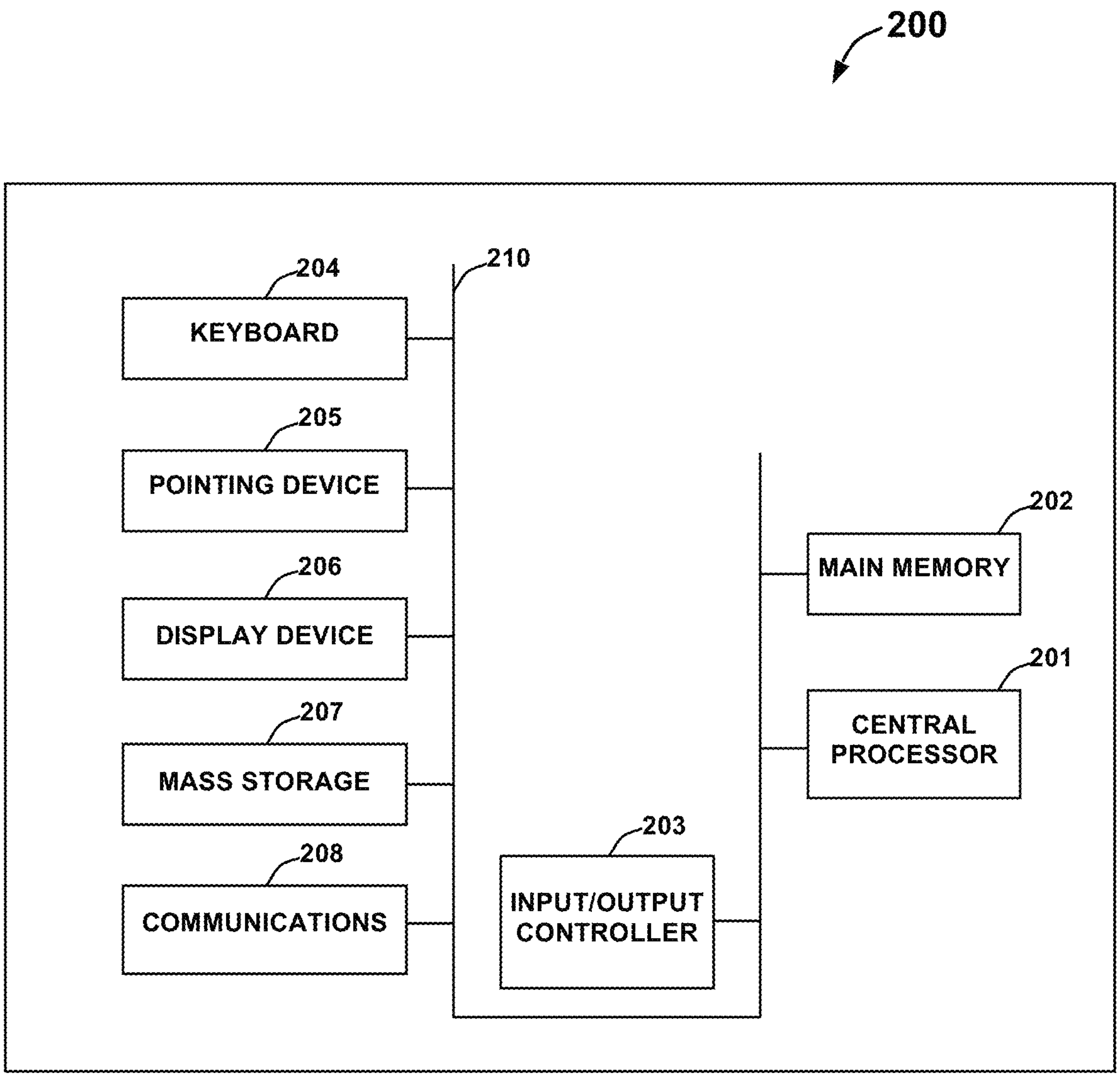
FIG. 2 illustrates a schematic view of a computer system in which the present invention can be embodied.
Figure 3:
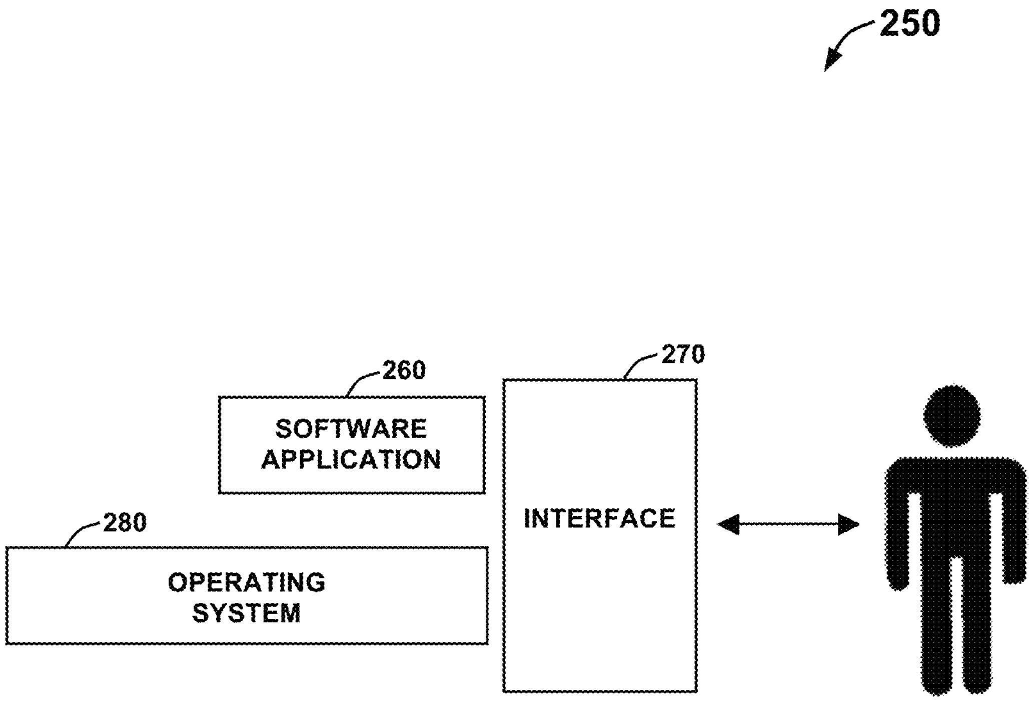
FIG. 3 illustrates a schematic view of a software system including an operating system, application software, and a user interface that can be used for carrying out the present invention.
Figure 4:
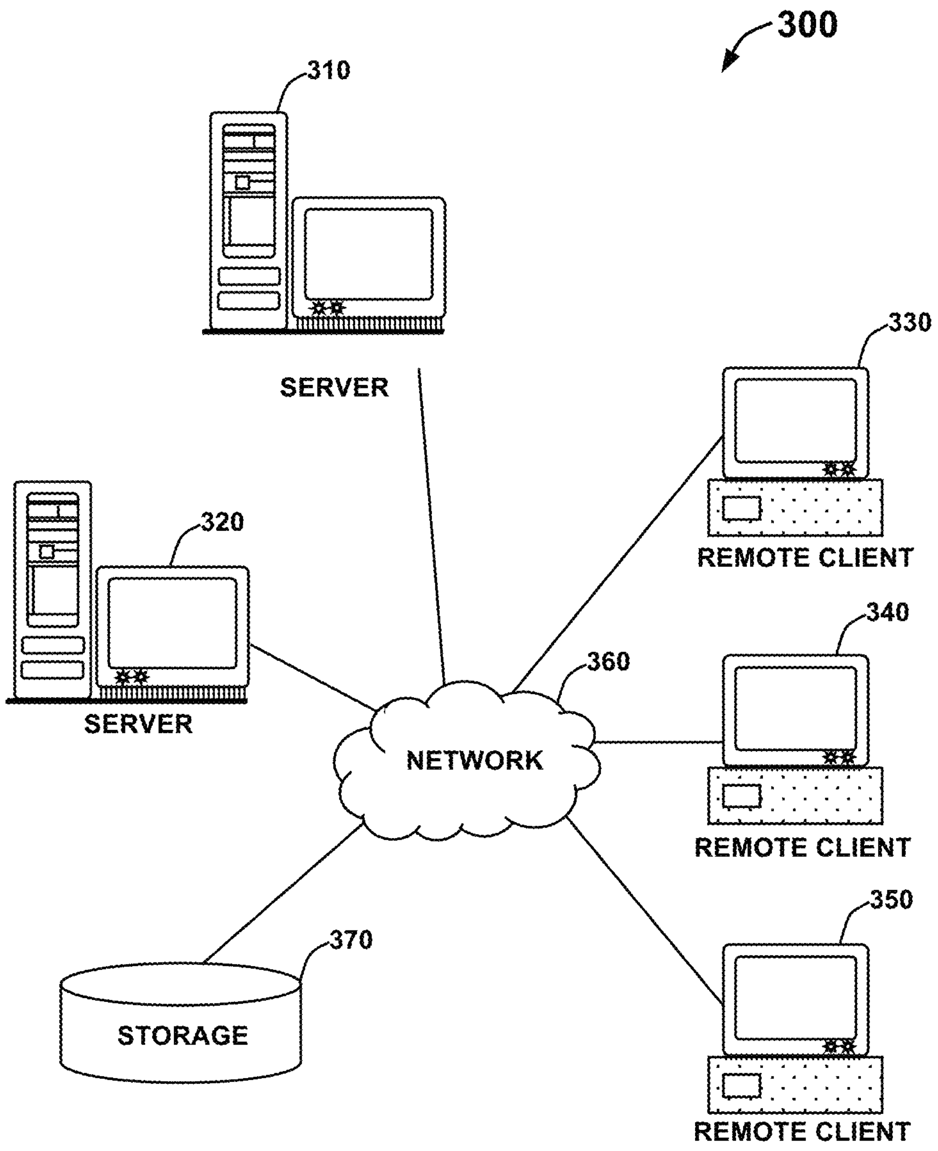
FIG. 4 depicts a graphical representation of a network of data processing systems in which aspects of the present invention can be implemented.

FIGS. 2-4 are provided as exemplary diagrams of data processing environments in which embodiments of the present invention may be implemented. It should be appreciated that FIGS. 2-4 are only exemplary and are not intended to assert or imply any limitation with regard to the environments in which aspects or embodiments of the present invention may be implemented. Many modifications to the depicted environments may be made without departing from the spirit and scope of the present invention.

As depicted in FIG. 2, the present invention may be embodied in the context of a data-processing apparatus 200 comprising a central processor 201, a non-transitory main memory 202, an input/output controller 203, a keyboard 204, a pointing device 205 (e.g., mouse, track ball, pen device, touch sensitive display, or the like), a display device 206, and a mass storage 207 (e.g., hard disk). Additional input/output devices, such as wireless communications 208, may be included in the data-processing apparatus 200 as desired. The wireless communications 208 can include cellular, GPS, satellite, etc. As illustrated, the various components of the data-processing apparatus 200 communicate through a system bus 210 or similar architecture. It should be appreciated that data-processing apparatus 200 can comprise a WIFI enabled device, an RFID enabled device, a Bluetooth enabled device, a cellular telephone, a Smartphone, a tablet computer, a portable computer, or the like.

Figure 1:
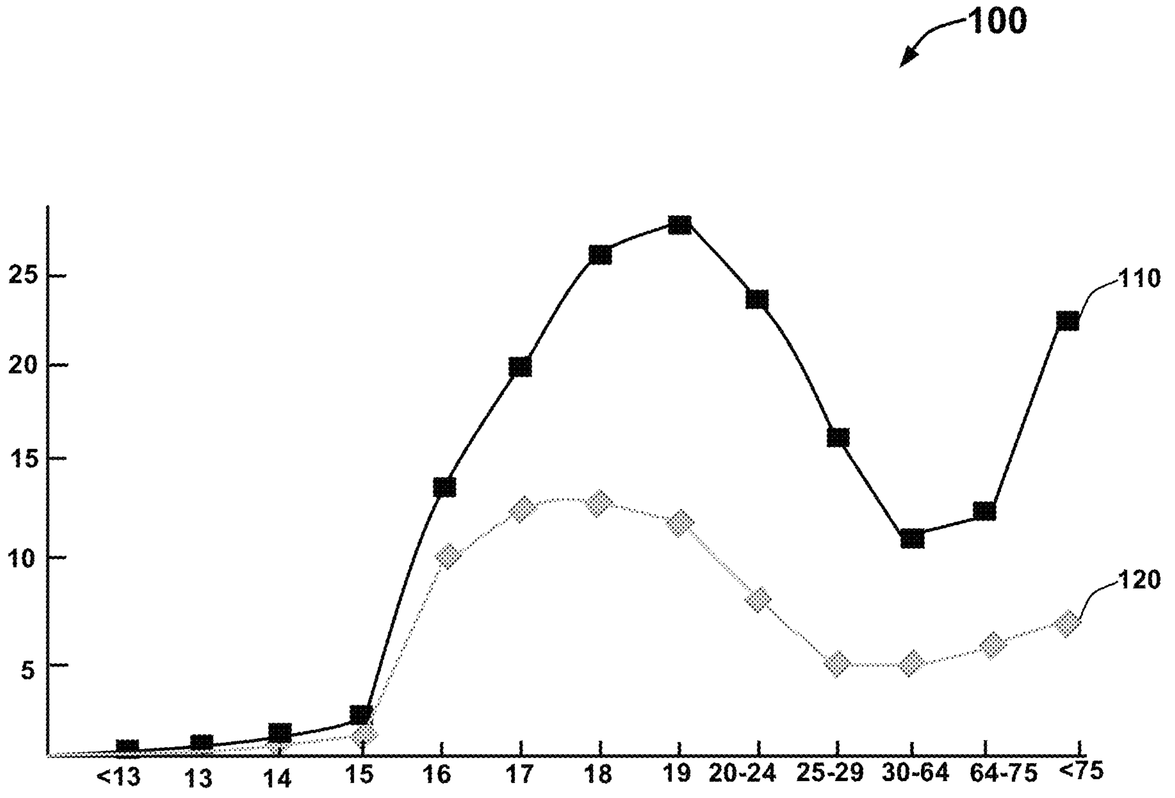
FIG. 1 illustrates a graphical representation depicting actual deaths in passenger vehicles by age.

FIG. 3 illustrates a computer software system 250 for directing the operation of the data-processing apparatus 200 depicted in FIG. 1. Software system 250, which is stored in main system memory 202 and on disk memory 207, can include a kernel or operating system 280 and a shell or interface 270. One or more application programs, such as software application 260, may be "loaded" (i.e., transferred from mass storage 207 into the main memory 202) for execution by the data-processing apparatus 200. The data-processing apparatus 200 receives user commands and data through user interface 270; these inputs may then be acted upon by the data-processing apparatus 200 in accordance with instructions from operating module 280 and/or application module 260.

The interface 270, which is preferably a graphical user interface (GUI), also serves to display results, whereupon the user may supply additional inputs or terminate the session. In one possible embodiment, operating system 280 and interface 270 can be implemented in the context of menu-driven systems. It can be appreciated, of course, that other types of systems are possible. For example, rather than a traditional menu-driven system, other operation systems can also be employed with respect to operating system 280 and interface 270. Software Application Module 260 can be adapted for monitoring and controlling vehicle usage by high-risk drivers utilizing an operating profile. Software application module 260 can be adapted for providing a real time, remote and/or wireless alarm signal if the driver violates the operating profile. Software application module 260, on the other hand, can include instructions, such as the various operations described herein with respect to the various components and modules described herein.

The following discussion is intended to provide a brief, general description of suitable computing environments in which the method and system may be implemented. Although not required, the method and system will be described in the general context of computer-executable instructions, such as program modules, being executed by a single computer, Smartphone, tablet computer, or other similar device. Generally, program modules include routines, programs, objects, components, data structures, etc., that perform particular tasks or implement particular abstract data types. Moreover, those skilled in the art will appreciate that the method and system may be practiced with other computer system configurations, including hand-held devices, multi-processor systems, microprocessor-based or programmable consumer electronics, networked PCs, minicomputers, mainframe computers, and the like.

FIG. 4 depicts a graphical representation of a network of data processing systems 300 in which aspects of the present invention may be implemented. Network data processing system 300 is a network of computers in which embodiments of the present invention may be implemented. Network data processing system 300 contains network 360, which is the medium used to provide communications links between various devices and computers connected together within network data processing apparatus 200. Network 360 may include connections, such as wire, wireless communication links, Bluetooth, or fiber optic cables.

In the depicted example, server 310 and server 320 connect to network 360 along with storage unit 370. In addition, remote clients 330, 340, and 350 connect to network 360. These remote clients 330, 340, and 350 may be, for example, vehicle-based or portable computers, transducers, sensors, GPS devices, etc. Data-processing apparatus 200 depicted in FIG. 2 can be, for example, a client such as client 330, 340, and/or 350. Alternatively, data-processing apparatus 200 can be implemented as a server, such as servers 320 and/or 310, depending upon design considerations.

In the depicted example, server 320 provides data, such as operating commands, operating system images, and applications to clients 330, 340, and 350. Remote clients 330, 340, and 350 are clients to server 320 in this example. Network data processing system 300 may include additional servers, clients, and other devices not shown. Specifically, clients may connect to any member of a network of servers which provide equivalent content.

In the depicted example, network data processing system 300 is the Internet with network 360 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 300 also may be implemented as a number of different types of networks, such as for example, cellular, satellite, or other wireless communications means such as Bluetooth, or using RFID technology.

The following description is presented with respect to embodiments of the present invention, which can be embodied in the context of a data-processing system such as data-processing apparatus 200, computer software system 250 and network 360 depicted respectively in FIGS. 2-4. The present invention, however, is not limited to any particular application or any particular environment. Instead, those skilled in the art will find that the system and methods of the present invention may be advantageously applied to a variety of system and application software, including database management systems, word processors, and the like. Moreover, the present invention may be embodied on a variety of different platforms, including Macintosh, UNIX, LINUX, and the like. Therefore, the description of the exemplary embodiments, which follows, is for purposes of illustration and not considered a limitation.

Figure 5:
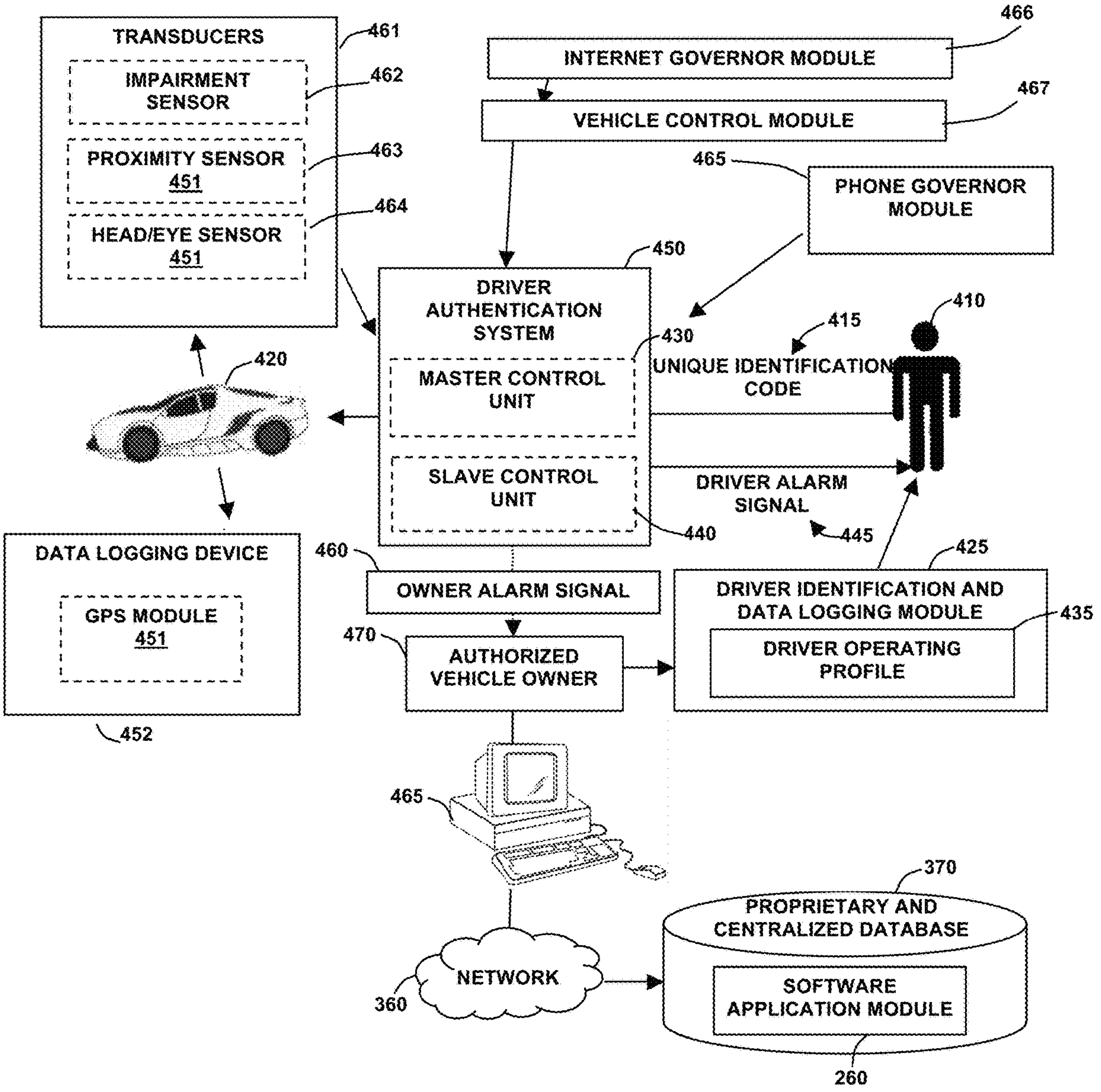
FIG. 5 illustrates a block diagram of a driver authentication system, in accordance with an embodiment.

FIG. 5 illustrates a block diagram of a driver authentication system 450, in accordance with an embodiment. Note that in FIGS. 1-8, identical or similar blocks are generally indicated by identical reference numerals. The driver authentication system 450 can be utilized for monitoring and controlling vehicle usage by high-risk drivers such as driver 410. The high-risk drivers can be, for example, teen drivers, fleet and rental drivers, and habitually reckless drivers, sleepy drivers, impaired drivers etc. The authentication system 450 can provide effective training and safety means for the high-risk driver 410 by setting safe operating parameters. The system 450 monitors a vehicle 420 and provides real time driver corrective feedback to an authorized vehicle owner 470 of the vehicle 420.

The system 450 generally includes a master control unit 430 and a slave control unit 440 that can be accessed and programmed via the software application module 260 stored in the proprietary and centralized database 370. Note that as utilized herein, the term "module" may refer to a physical hardware component and/or to a software module. In the computer programming arts, such a software "module" may be implemented as a collection of routines and data structures that performs particular tasks or implements a particular abstract data type. Modules of this type are generally composed of two parts. First, a software module may list the constants, data types, variable, routines, and so forth that can be accessed by other modules or routines. Second, a software module may be configured as an implementation, which can be private (i.e., accessible only to the module), and which contains the source code that actually implements the routines or subroutines upon which the module is based.

Therefore, when referring to a "module" herein, the inventors are generally referring to such software modules or implementations thereof. The methodology described herein can be implemented as a series of such modules or as a single software module. Such modules can be utilized separately or together to form a program product that can be implemented through signal-bearing media, including transmission media and recordable media. The present invention is capable of being distributed as a program product in a variety of forms, which apply equally regardless of the particular type of signal-bearing media utilized to carry out the distribution.

Examples of signal-bearing media can include, for example, recordable-type media, such as floppy disks, hard disk drives, CD ROMs, CD-Rs, etc., and transmission media, such as signals transmitted over digital and/or analog communication links. Examples of transmission media can also include devices such as modems, which permit information to be transmitted over standard cellular communications and/or the more advanced wireless data communications.

The proprietary and centralized database 370 including the software application 260 can be accessed via a remote computer 465 and the network 360. Note that the remote computer 465 can be a data processing apparatus 200 depicted in FIG. 2 and may alternatively be embodied as a smart phone, tablet computer, or other mobile computing device. The authorized vehicle owner 470 can access the software application 260 over a data network 360, via the remote computer 465 (remote computer 465 may be embodied as a smart phone, tablet computer, laptop computer, or other mobile computing device), in order to program a desired operating profile 435 representing various operating parameters associated with the vehicle 420. Note that the operating parameters can be for example, but are not limited to, data concerning maximum allowable vehicle speed, user infraction limits, mobile device operating parameters, impaired driver parameters, vehicle locations, vehicle hours of operation and seat belt usage associated with the vehicle 420. The system 450 can also track various other features such as for example, data concerning hard braking and fast cornering, etc. Note that these features may or may not be viewed as key risk factors and therefore can be offered as additional features to the basic operating parameters of the driver authentication system 450.

The authorized vehicle owner 470 can be for example, but is not limited to a parent of a teen, a fleet manager or operator, and a judicial authority, etc. The operating profile 435 programmed by the owner 470 can include a set of driving rules and conditions that best fit the requirements of the intended high-risk driver 410 within the vehicle 420.

Further, the operating profile 435 can be loaded to a driver identification and data logging module 425. The driver identification and data logging module 425 can be a mobile telephone, a Smartphone, a WIFI enabled device, an RFID enabled device, a Bluetooth enabled device, a tablet computer a USB compatible device such as for example, iButton, radio frequency identification device (RFID), software, etc. that can be utilized in conjunction with the remote computer 465 in order to wirelessly load the operating profile 235 into the master control unit 430. This requires master control unit 430 to be capable of accepting data via WIFI, RFID, Bluetooth, USB, via cellular data signals, etc. The driver identification and data logging module 225 can allow identification of various drivers 410 associated with the vehicle 420, thereby allowing the vehicle 420 to perform one way for the intended high-risk driver 410, yet another way for the authorized vehicle owner 470.

The driver authentication and data logging module or device 425 can be connected to the remote computer 465 wirelessly or otherwise, and the operating profile 435 can be stored. The master control unit 430 can authenticate the driver 410 utilizing a unique identification code 415 provided by the driver identification and data logging module 425.

In one embodiment, the driver authentication and data logging module or device 425 can be a smart phone with one or more of WIFI, RFID, Bluetooth, and GPS capabilities. The device 425 or phone is transported with the potential driver. When the driver enters the vehicle, the device 425 can automatically, or at the user's request, connects to the master control unit 465. The device 425 can wirelessly provide the unique identification code 415 (which may be stored on the devices memory or may be entered by the driver via the device 425) to authenticate the driver. The device may further store the driver operating profile 435 for the driver and provide that profile to the master control unit 430.

A data logging device 452 can be used to record vehicle operation data associated with the operation of the vehicle. Included may be a GPS module 451 which can be used to monitor the vehicles speed, location, and acceleration/deceleration data. The data collected by the data logging device 452 can be provided to the master control unit 430. In another embodiment, the data logging device 452 and GPS module 451 may be provided as functionalities associated with the driver identification and data logging module when that module is embodied as a mobile device equipped with at least GPS capabilities (i.e., a Smartphone with GPS capability).

The master control unit 430 can enable vehicle operation within the programmed operating profile 435. If the driver 410 violates the preprogrammed operating profile 435 the master control unit 430 can communicate with the slave control unit 440 and generate a real time driver alarm signal 445. The alarm signal 445 can result in an actual audible alarm, or it can be used to control/govern operational aspects of the vehicle. For example, the real time driver alarm signal 445 can be used to communicate conditions to the driver, limit/disable radio functionality, limit/disable mobile cellular devices in the vehicle, limit/disable internet applications provided in the vehicle, limit/disable GPS related applications provided by the vehicle, limit/disable the driver's cellular telephone or other such devices in the vehicle, govern mechanical operations (e.g., lower/limit speed), remotely contact vehicle owners/fleet managers, and other electrical or mechanical functions, while maintaining driver and occupant safety.

The driver alarm signal 445 generated by the slave control unit 440 can remain until the driver 410 corrects the operating conditions and brings the vehicle 420 within the programmed operating profile 435. The slave control unit 440 can generate the driver alarm signal 445 via a voice synthesized means, sounding a cabin buzzer, sounding toggling the dome light and/or cutting the radio off, etc. The slave control unit can in addition, or alternatively, provide the alarm signal 445 to the driver identification and data logging module 425, and cause that device to sound an alarm etc. Also, the system 450 can provide an owner alarm signal 460 that remotely alerts the authorized vehicle owner 470 regarding violation of the programmed operating profile 435. The owner alarm signal 460 can be an auto dial feature that communicates the authorized owner 470 via a cellular or data network.

Alternatively, or additionally, the wireless identification and data logging module 425 can be configured to wirelessly receive vehicle specific performance and infraction data from the master control unit. This data may also be formatted to provide feedback to the driver via a display associated with the wireless identification and data logging module 425 to help the driver correct their potentially unsafe driving habits.

A plurality of transducers 461 may further be provided throughout the vehicle 420. These transducers 461 can be configured as sensors designed to measure various data related to the vehicle and vehicle driver. For example, the sensors 461-464 may provide information regarding the location, speed, acceleration, proximity to other vehicles, proximity to road obstructions, proximity to street lines, driver head movement, driver eye movement, ambient vehicle noise, driver Blood Alcohol Level, etc.

Information from these sensors can be provided to the slave control unit 440. The slave control unit 440 can process the data collected from the sensors and determine if the data indicates a condition that requires a warning. For example, the sensors may indicate that the vehicle is speeding, veering off the road, approaching an obstruction in the road, too close to another vehicle, that the vehicle driver is distracted, sleepy, or not paying attention, that the vehicle driver is impaired etc. If one of these conditions is identified, the slave control unit 440 signals the master control unit 430 and the master control unit issues a driver alarm signal 445 as described above. In the case where the impairment sensor 462 provides a signal to the slave control unit 440 indicating that the driver's impairment is above a prescribed limit, the slave control unit can prevent the vehicle from starting.

The master control unit 430 can be configured to include driver identification and validation module 502, a GPS antenna processing module 504, a master micro controller and processor 506, a memory module 508 and a function indicator module 510. The master control unit 430 may also receive data indicative of the speed of the vehicle 420, the location of the motor vehicle 420, and the time of day from a plurality of sources including a WIFI enabled device, an RF source, a Bluetooth enabled device, and a smart-road network source. This would allow the master control unit 430 to for example, receive real-time data indicative of the present road the vehicle 420 is travelling on via any of a WIFI enabled device, an RF source, a Bluetooth device, and a smart-road network source. The driver identification and validation module 502 can be utilized to authenticate the driver 410 utilizing the unique identification code 415 and enable the vehicle operation. The master control unit 430 can interpret driver authorization and ascertain the vehicle speed. The master control unit 430 also interprets the location and time of day parameters versus maximum desired threshold limits.

The driver operating profile 435 can be programmed by the authorized vehicle owner 470 to place limits on the operation of the vehicle 420 by the driver 410. For example, the driver operating profile can define speed limits for each unique driver and can include geo-fencing for each driver. These limits can be dynamically determined according to location provided via the GPS module and time of day. For example, a concerned parent may set a geo-fence of 20 miles from their house for their teenage driver during the day and a 10 mile geo-fence at night. If the teenage driver exceeds this distance an alarm signal can be provided by the master control unit 430. Similarly, the parent can set speed limits that prevent the teenage driver from exceeding the speed limit on any road by more than 3 miles per hour. The speed limit can be identified for each road via wireless, GPS, or smart road network technology. If the teenage driver exceeds that limit an alarm signal can be provided by the master control unit 430 to the parent. Alternatively, or additionally, the vehicle control module 467 can be signaled by the master control unit 430 to reduce the speed of the vehicle automatically if it exceeds the prescribed limits. The driver operating profile 435 can, in this way define a maximum vehicle speed, an allowable vehicle location, allowable hours of vehicle operation, require the driver's seat belt be engaged before the vehicle can be started, and define an impairment threshold for the driver.

The master control unit 430 can also provide real-time data regarding vehicle location, speed, and infractions to the authorized vehicle owner. Preferably, this data can be provided via network connection at the computer 465 (embodied as a cellular telephone, smart phone, tablet computer, vehicle integrated wireless communication device, WIFI enabled device, RFID enabled device, Bluetooth enabled device, mobile computer etc.) of the authorized vehicle owner.

The driver authentication system can include a phone governor module 465. The phone governor module 465 can be software installed on a driver's 410 cellular telephone, smart phone, tablet computer, vehicle integrated wireless communication device, WIFI enabled device, RFID enabled device, Bluetooth enabled device, mobile computer etc. The phone governor device is configured to receive instructions from the master control unit 430. The master control unit 430 can instruct the phone governor module 465 to restrict calls on the driver's mobile device. This can include preventing any incoming or outgoing calls or restriction on phone numbers that can be dialed out or received. The master control unit 430 can further instruct the phone governor module 465 to power down the mobile device and disable text messaging or other applications involving text entry. Similarly, an internet governor module 466 may be configured to signal the master control unit 430 to disable all integrated in-vehicle internet or GPS related applications while the vehicle is in operation. This may include on-board mapping applications, services associated with the vehicle, internet search services, etc.

A vehicle control module 467 can also be configured to operate with the master control unit 430 to accelerate the vehicle, decelerate the vehicle, or alter the vehicle's direction. For example, if head/eye sensors 464 indicate that driver 410 is asleep while the vehicle is in motion, vehicle control module 467 can prompt the master control unit 430 to in addition to issuing an alarm, operate the vehicle's brakes automatically to reduce the speed of the vehicle until the vehicle is stopped. The vehicle control module 467 can further be instructed by the master control unit to simultaneously direct the vehicle out of traffic and on the shoulder of the road until the driver is awake.

The GPS antenna processing module 504 can be utilized to determine and measure time of day, speed and location data of the vehicle 420. The GPS antenna processing module 504 provides location information associated with the vehicle 420 to the authorized vehicle owner 470 hence the system 450 is compatible for any vehicle for monitoring and controlling the high-risk driver 410. The master microcontroller/processor 506 can process and control the operations associated with the master control unit 430. The memory module 508 associated with the master control unit 430 can be utilized to store the driver authentication 415 and operating profile 435 associated with the driver 410. The memory module 508 can further provide information for proper operation of the vehicle 420. The function indicator module 510 can monitor various functions in association with the vehicle 420 such for example, power, fault detection and monitoring, and other functions.

The master control 430 can be configured to define a number of operating parameters for a given driver such as a maximum speed limit and a geo-fence limit defining an acceptable space in which the vehicle may be operated. These parameters may be dependent on the time of day. Likewise, the parameters can be dynamically set according to the present location of the vehicle.

Figure 6:
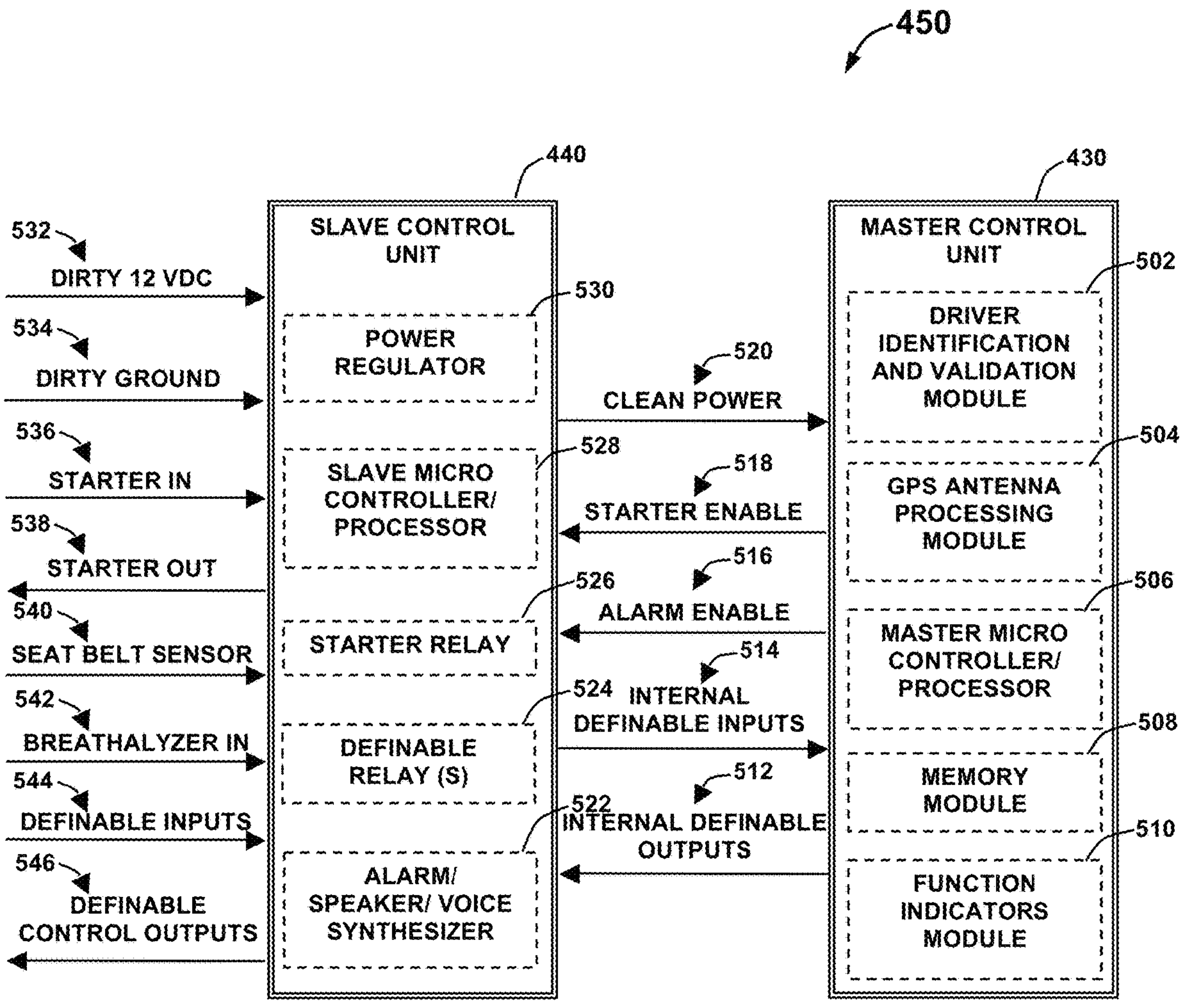
FIG. 6 illustrates a schematic block diagram of the driver authentication system for monitoring and controlling vehicle usage, in accordance with an embodiment.

FIG. 6 illustrates a schematic block diagram of the driver authentication system 450, in accordance with an embodiment. The master control unit 430 can authenticate the driver 410 utilizing the unique identification code 415 provided by the data logging device 425. The data logging device 425 associated with the master control unit 430 can be collectively called as 'brain' of the driver authentication system 450. The master control unit 430 can be installed in the vehicle 420 in a suitable place where the master control unit 430 can be directly exposed to the driver from a dash board of the vehicle 420.

The master control unit 430 can communicate and send commands to the slave control unit 440 associated with the driver authentication system 450. The slave control unit 440 can include a power generator 530, a slave micro controller and processor 528, a starter relay 526, a definable relay 524, and an alarm synthesizer 522. The slave control unit 440 can be mounted under the dash board of the vehicle 420. The slave control unit 440 can receive wireless commands from master control unit 430 and generates the alarm signal 445 and 460. The slave control unit 440 can include pins such as a dirty 12 VDC pin 532, a dirty ground pin 534, a starter in pin 536, a starter out pin 538, seat belt sensor pin 540, a breathalyzer pin 542, a definable input pin on dash slave control unit 440.

The power regulator 530 can be utilized to regulate a power source and operate the system 450 via the dirty 12 VDC pin 532 and the dirty ground pin 534. The starter relay 526 can be an electromechanical device that is operated by an electrical current that is provided by the starter in pin 536. The starter relay 526 can be enabled by a starter enable signal 518 from the master control unit 430 when the driver 410 is authenticated. The starter relay 426 can generate an output via a starter out pin 538 that can be a mechanical function utilized to operate the vehicle 420. The seat belt sensor pin 540 can be externally connected to a seat belt sensor associated with the vehicle 420 where it obtains the information regarding usage of seat belt by the driver 410.

The breathalyzer 542 in pin 524 can provide status regarding alcohol consumption of the driver 410 while driving the vehicle 420. The slave microcontroller/processor 528 can process and control the operations of the slave control unit 440. The alarm/speaker/voice synthesizer 522 can receive the alarm enable signal 516 from the master control unit 430 and generate the owner programmed driver alarm signal 445 in the vehicle 420 when the driver 410 violates the programmed parameters. Furthermore, the master control unit 430 and the slave control unit 440 can be communicated via various communication signal lines such as a clean power signal 520, an alarm enable signal 516, internal definable input signal 514 and an internal definable output signal 512.

Figure 7:
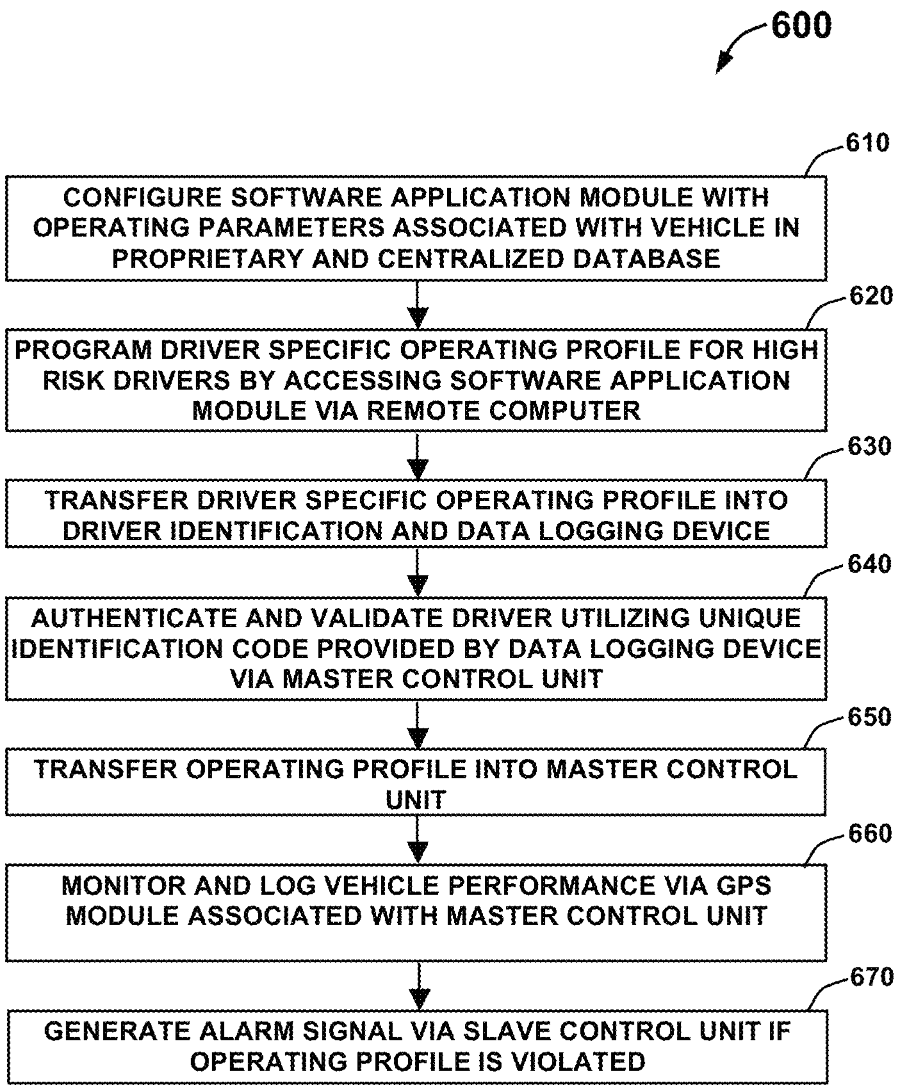
FIG. 7 illustrates a flow chart of operation illustrating logical operation steps of a method for monitoring and controlling vehicle usage, in accordance with embodiments.

FIG. 7 illustrates a flow chart of operation illustrating logical operation steps of a method 600 for monitoring and controlling vehicle usage, in accordance with an embodiment. The software application module 260 with operating parameters associated with the vehicle 420 can be configured and stored in the proprietary and centralized database 370, as depicted at block 610. The driver specific operating profile 435 for the high-risk driver 410 can be programmed by accessing the software application 260 via the remote computer 465, as indicated at block 620. Note that the software application 260 can include programming software that can be utilized to program the features of the driver authentication system 450. The software application module 260 monitors various parameters such as the 'trigger' levels for speed, and time of operation, etc. The software application module 260 can be accessible by the authorized owners 470 and can also be utilized to download the actual data logged during the operation of the vehicle 420. Further, the software application 260 can also be intuitive for the customer through the process of selecting parameters, trigger thresholds, etc.

The operating profile 435 for the driver 410 can be loaded to the driver identification and data logging module 425, as illustrated at block 630. The master control unit 430 can authenticate and validate the driver 410 utilizing the unique identification code 415 provided by the driver identification and data logging module 425, as indicated at block 640. The operating profile 435 for the driver 410 can be transferred to the master control unit 430, as shown at block 650. The master control unit 430 monitors and logs vehicle performance via the GPS module 504 associated with master control unit 430, as depicted at block 660. The slave control unit 440 generates the driver alarm signal 445, if the driver 410 violates the programmed operating profile 435, as illustrated at block 670.

Figure 8:
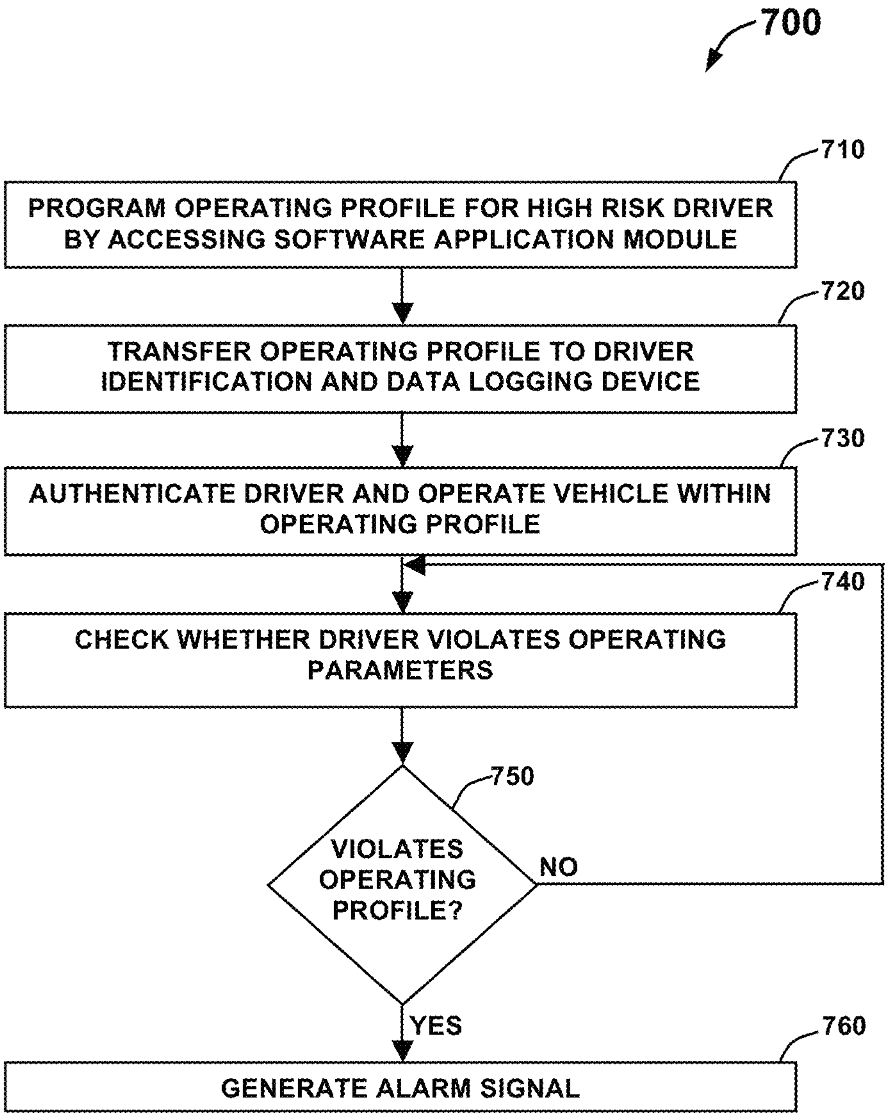
FIG. 8 illustrates a high level flow chart of operation illustrating logical operation steps of a method for monitoring and controlling vehicle usage by a high-risk driver, in accordance with embodiments.

FIG. 8 illustrates a high level flow chart of operation illustrating a method 700 for monitoring and controlling vehicle usage by the high-risk driver 410, in accordance with an embodiment. Again, as reminder, in FIGS. 1-8, identical or similar blocks are generally indicated by identical reference numerals. The operating profile 435 for the high-risk driver 410 can be programmed by accessing the software application 260 via the remote computer 465, as depicted at block 710. The programmed operating profile 435 for the high-risk driver 410 can be transferred into the driver identification and data logging module 425, as illustrated at block 720.

The driver 410 can be authenticated utilizing the unique identification code 415 provided by the driver identification and data logging module 425 and the programmed operating profile 435 for the driver 410 can be copied into the driver authentication system 450, as depicted at block 730. A determination can be made whether the driver 410 violates the operating profile 435, as illustrated at block 740. If the driver violates the operating profile 435, as shown at block 750, the driver alarm 445 signal can be generated by the driver authentication system 450, as depicted at block 755. Otherwise, the process can be continued to block 740.

The driver authentication system includes features such as data logging, alarming, operation governance, ease of programmability and utilizes GPS technology to provide high-risk driver safety. The system provides user awareness that reduce the likelihood of a high-risk driver injury or fatality by helping the high-risk drivers with safe driving habits through immediate and real time feedback and governing. The programmable operating parameters associated with the real time driver feedback can categorize the system as unique driver safety device. Additionally, the system and method described herein can provide multiple operating profiles for a single vehicle that allows the owners to operate the vehicle without any restrictions yet have restrictions in affect when the vehicle is operated by the high risk driver.

It will be appreciated that variations of the above-disclosed and other features and functions, or alternatives thereof, may be desirably combined into many other different systems or applications. It will be further appreciated that that various presently unforeseen or unanticipated alternatives, modifications, variations or improvements therein may be subsequently made by those skilled in the art, which are also intended to be encompassed by the following claims.

In one embodiment a driver authentication and monitoring system, can comprise a wireless identification and data logging module; a master control unit in a motor vehicle for wirelessly authenticating at least one driver via the wireless driver identification and data logging module and associating an operating profile with the at least one driver; a GPS module providing at least location and speed information in association with movement of the motor vehicle; a data logging device recording vehicle operation data associated with a use of the motor vehicle by the at least one driver comprising at least the location and speed information from the GPS module; and a slave control unit in the motor vehicle and in communication with the master control unit, the slave control unit configured to receive commands from the master control unit and to generate an alarm signal if the at least one driver violates the operating profile unique to the at least one driver thereby providing feedback about the vehicle usage; wherein the master control unit permits the at least one driver to operate the vehicle within an operating profile if the master control unit receives at least one of a unique identification code to permit the at least one driver to operate the vehicle within an operating profile and the at least one driver has not violated the operating profile.

The driver authentication and monitoring system can further comprise a plurality of transducers comprising at least one of proximity sensors, head movement sensors, and eye movement sensors wherein the transducers send signals to the slave control unit and the slave control unit determines if the signals are indicative of a driving condition requiring a warning and in turn signals the master control unit to alert the driver. The driver authentication and monitoring system also comprises an impairment sensor wherein the slave control unit receives signals from impairment sensor and prevents the motor vehicle from starting when the transducer senses a driver impairment above a prescribed limit.

The driver authentication and monitoring system can further involve configuring the wireless identification and data logging module as at least one of a WIFI enabled device; an RFID enabled device, a Bluetooth enabled device; a cellular telephone; and a smart phone.

In another embodiment of the driver authentication system, the wireless identification and data logging module can be further configured to wirelessly load the operating profile for the at least one driver into the master control unit. The wireless identification and data logging module can be further configured to wirelessly receive driver specific vehicle performance and infraction data from the master control unit and present the driver specific vehicle performance and infraction data.

In another embodiment of the driver authentication device, the master control unit can be further configured for wirelessly receiving data indicative of a speed of the motor vehicle, a location of the motor vehicle, and a time of day from at least one of a WIFI source; an RF source; a Bluetooth source; and a smart-road network source. The master control is configured for wirelessly receiving data indicative of a speed limit associated with a road the motor vehicle is currently traveling on from at least one of a WIFI source; an RF source; a Bluetooth source; and a smart-road network source. The master control is configured to define a maximum speed limit and a geo-fence limit for the at least one driver according to the time of day.

In another embodiment, the driver authentication module can further comprise an alarm module configured to wirelessly receive data from at least one of the master controller, the slave controller, and the GPS module wherein the alarm module is further configured to present at least one of location data, speed data, and infraction data in real time. The alarm module comprises at least one of a cellular telephone; a smart phone; a computer; a vehicle integrated wireless communication device; a WIFI enabled device; an RFID enabled device; and a Bluetooth enabled device.

The driver authentication device further comprises a phone governor module configured to receive at least one instruction from the master control unit the instructions comprising at least one of restricting calls on the at least one driver's cellular telephone; powering off the at least one driver's cellular telephone; and disabling text messaging on the at least one driver's cellular telephone.

The driver authentication device further comprises an internet governor module configured to disables all integrated in-vehicle internet related applications when the vehicle is in operation.

The driver authentication device further comprises a vehicle control module configured to receive at least one instruction from the master control unit the instructions comprising at least one of reducing the vehicles speed; increasing the vehicles speed; and altering the vehicles direction.

The driver authentication and monitoring system includes the slave control unit further comprising a power regulator module; a starter relay module; a definable relay module; a slave microcontroller; and an alarm synthesizer. The operating profile comprises at least one operating parameter including at least one of: a maximum allowable vehicle speed; an allowable vehicle location; allowable hours of operation; and a seatbelt usage. The slave control unit generates an alarm signal for remotely alerting the authorized user when the at least one driver violates the operating profile.

What is claimed is:

1. A driver authentication and monitoring system, comprising:

a first software application for loading on a first mobile computing device, the software application, when loaded, configures through a menu-driven graphical user interface one or more operator profiles with selectable parameters for a motor vehicle;

the first software application further configured to select one of the plurality of operator profiles to be used in monitoring an operation of the motor vehicle;

the first software application adapted to wireless communication with a second software application for loading to a master control unit integral with the motor vehicle at least one of the plurality of operator profiles;

the master control unit operating in the motor vehicle for authenticating a driver to the vehicle, and for receiving data pertaining to the parameters of the selected operator profile;

a slave control unit installed in the motor vehicle, wherein the slave control unit communicates with the master control unit, monitors the operation of the motor vehicle by the driver, and transmits a signal if the driver violates one or more parameters of the selected operator profile;

a data logging device that records vehicle operation data associated with the operation of the motor vehicle by the driver, the vehicle operation data comprising at least vehicle speed and geolocation information;

the first software application configured to receive one or more alerts in response to the driver violating one or more parameters of the selected operator profile; wherein the selectable parameters comprise a maximum allowable vehicle speed and an allowable vehicle location;

wherein the one or more alerts received by the first software application are sent over a wireless, cellular or data network and wherein the first mobile computing device is further configured to communicate with the multimedia system of the vehicle.

2. The driver authentication and monitoring system of claim 1, further comprising bidirectional communication between the master control unit and the slave control unit, wherein received location and speed information are determined by a movement of the motor vehicle.

3. The driver authentication and monitoring system of claim 1, further comprising: a GPS module; and a memory module.

4. The driver authentication and monitoring system of claim 3, wherein the operating profile is loaded into the memory module for enabling controlled operation of the vehicle when the at least one driver is authenticated.

5. The driver authentication and monitoring system of claim 3, wherein the GPS module provides location information for the vehicle to at least the master control unit in association with a physical location of the vehicle.

6. The driver authentication and monitoring system of claim 1, wherein the selectable parameters further comprise at least one of: seatbelt usage and allowable hours of operation.

7. The driver authentication and monitoring system of claim 1, wherein the slave control unit includes a processor and is programmable.

8. A method of authenticating and monitoring drivers, the method comprising:

receiving, by a computer unit, data pertaining to one or more operator profiles for a motor vehicle from a first software application loaded on a first mobile computing device;

receiving, by the computer unit, data pertaining to selection of one of the plurality of operator profiles to be used in monitoring an operation of the motor vehicle by a driver;

loading, to a master control unit integral with the motor vehicle, at least one of the plurality of operator profiles;

receiving, by a master control unit operating in the motor vehicle for authenticating a driver to the vehicle, data pertaining to the selected operator profile;

monitoring, by a slave control unit installed in the motor vehicle, the operation of the motor vehicle by the driver, to determine if the driver violates one or more parameters of the selected operator profile; recording, by a data logging device, vehicle operation data associated with the operation of the motor vehicle by the driver comprising vehicle speed and geolocation information;

receiving, by the first software application, one or more alerts in response to the driver violating one or more parameters of the selected operator profile;

wherein the data pertaining to one or more operator profiles comprises one or more selectable parameters related to the operation of the motor vehicle;

wherein the selectable parameters comprise a maximum allowable vehicle speed and an allowable vehicle location;

wherein the one or more alerts received by the first software application are sent over a wireless cellular or data network.

9. The method of claim 8, wherein the first software application executes on a first mobile computing device and the first mobile computing device is further configured to communicate with the multimedia system of the vehicle.

10. The method of claim 8, wherein the selectable parameters further comprise allowable hours of operation.

11. The method of claim 8, wherein the selectable parameters further comprise seatbelt usage.

12. The method of claim 8 wherein the master control unit is configured to receive commands/communications from the slave control unit and the slave control unit is configured to receive commands/communications from the master control unit.

13. A driver authentication and monitoring system, comprising:

a master control unit comprising a mobile phone and a software application configured to run on said mobile phone for authenticating a driver of a vehicle;

a slave control unit physically separate from said master control unit and adapted to be used in said vehicle for wirelessly communicating with said master control unit using a wireless communication protocol;

wherein said master control unit is adapted to monitor vehicle operational parameters, said vehicle operational parameters comprising speeding and hard braking;

wherein said master control unit is adapted to generate logs of said at least some of said vehicle operational parameters;

wherein said master control unit and said slave control unit are operable to identify the driver of the vehicle and identify a profile with which said monitoring and logging are associated; and wherein said master control unit is adapted to provide reports to a remote server regarding at least some of said vehicle parameters over a mobile network.

14. The system of claim 13, wherein the wireless communication protocol is a short-range wireless technology standard used to connect at least two devices.

15. The system of claim 14, wherein the wireless communication protocol complies with a Bluetooth standard.

16. The system of claim 13, wherein said operational parameters further include fast cornering.

17. The system of claim 13, wherein said slave control unit further comprises a processor and an accelerometer.

18. The system of claim 13, adapted to authenticate the driver of the vehicle using a unique code.

19. The system of claim 13, wherein said system requires no external device physically attached to identify the driver of the vehicle.

20. The system of claim 19, wherein said slave control unit is adapted to cause a transmission of the vehicle to start after the system authenticates the driver.

21. The system of claim 20, wherein said slave control unit receives a start enable signal from said master control unit.

22. The system of claim 13, wherein the operating parameters further include a maximum allowable speed of said vehicle and an allowable location of said vehicle.

23. A system for authenticating and monitoring drivers, comprising:

an authentication module that is adapted to identifying and wirelessly authenticate a driver;

said master controller having: a programmable data processor having an associated software application for wireless authentication; a memory; a display;

a wireless communications module comprising an integrated wireless communications processor;

a user data entry device including a keyboard and a pointing device;

a driver authentication subsystem requiring no additional physical device attached to authenticate a driver;

a GPS module;

an accelerometer; and a gyroscope, wherein said master controller is adapted to wirelessly communicate with a slave controller using said wireless communications processor and wherein said master controller cooperates with at least said slave controller to identify a profile in which a monitoring occurs, and wherein said monitoring includes speeding, hard braking and fast cornering; and wherein said system is adapted to wirelessly transmit data related to the monitoring over a cellular data network running a software application on a master controller.

24. The system of claim 23, wherein the wireless communication is adapted to be a short-range wireless technology protocol used to connect at least two devices.

25. The system of claim 24, wherein the wireless communication protocol complies with a Bluetooth standard.

26. The system of claim 23, wherein said slave controller comprises a processor.

27. The system of claim 23, wherein authenticating the driver of the vehicle uses a unique code.

28. The system of claim 23, wherein said slave controller is adapted to cause the vehicle's transmission to start after it authenticates the driver.

29. A method of authenticating and monitoring drivers, comprising:

identifying and wirelessly authenticating a driver using an authentication module;

running a software application on a master controller, said master controller comprising: a programmable data processor; a memory; a display; a wireless communications module comprising an integrated wireless communications processor; a user data entry device including a keyboard and a pointing device; a driver authentication subsystem requiring no additional physical device attached to authenticate a driver; a GPS module; an accelerometer; and a gyroscope; wherein said master controller wirelessly communicates with a slave controller using said wireless communications processor; wherein said master controller cooperates with at least said slave controller to identify a profile in which a monitoring occurs; wherein said monitoring includes speeding and hard braking; and transmitting to at least one remote computer data related to the monitoring over a cellular data network.

30. The method of claim 29, wherein the wireless communication protocol is a short-range wireless technology standard used to connect at least two devices.

31. The system of claim 30, wherein the wireless communication protocol complies with a Bluetooth standard.

32. The system of claim 29, wherein said operational parameters further comprise fast cornering.

33. The method of claim 29, wherein said slave controller further comprises a processor and an accelerometer.

34. The method of claim 29, further comprising authenticating the driver of the vehicle using a unique code.

35. The method of claim 29, further comprising causing the vehicle's transmission to start after authenticating the driver and receiving a start enable communication signal instantiated by an input from said driver requesting vehicle start.

36. A system for driver authentication and monitoring, the system comprising:

at least one processor; and a computer-usable medium embodying computer program code, said computer-usable medium capable of communicating with said at least one processor, said computer program code comprising instructions executable by said at least one processor and configured for:

wirelessly pairing a slave control unit with a master control unit, wherein said master control unit and said slave control unit are to be placed for operation in a common vehicle;

authenticating a driver;

associating said driver with a specific driver profile for a vehicular trip;

supporting bidirectional digital communications between said master control unit and said slave control unit to identify the presence of a driver with which a profile has been previously associated, wherein said bidirectional digital communication is adapted to use a wireless communication protocol including a Bluetooth protocol and wherein said slave control unit includes a gyrometer and said master control unit includes a GPS receiver;

transmitting driver operation data from said slave control unit to said master control unit; and reporting information relating to hard braking data or fast cornering data to a remote server for later review.

37. The system of claim 36, wherein said transmitting driver operation data comprises transmitting said information from said to a remote computer wirelessly over a data network.

38. The system of claim 37, wherein said data network is a mobile data network and wherein the master control unit is configured to receive commands/communications from the slave control unit and the slave control unit is configured to receive commands/communications from the master control unit.

39. The system of claim 36, wherein said transmitting driver operation data further comprises transmitting data regarding compliance with a maximum allowable speed of said vehicle, an allowable location of said vehicle and allowable hours of operation of said vehicle.

40. The system of claim 36 wherein the slave control unit includes a processor and is programmable.

41. The system of claim 36 wherein the slave control unit is a single element.

42. The system of claim 36 wherein the master control unit is configured to receive commands/communications from the slave control unit and the slave control unit is configured to receive commands/communications from the master control unit.

43. The system of claim 36 wherein received location and speed information are determined by a movement of the common vehicle.

* * * * *